Oct. 30, 1956     A. GORDON, JR., ET AL     2,768,784
SEQUENTIAL INSPECTION INDICATOR
Filed Aug. 6, 1952     2 Sheets-Sheet 1
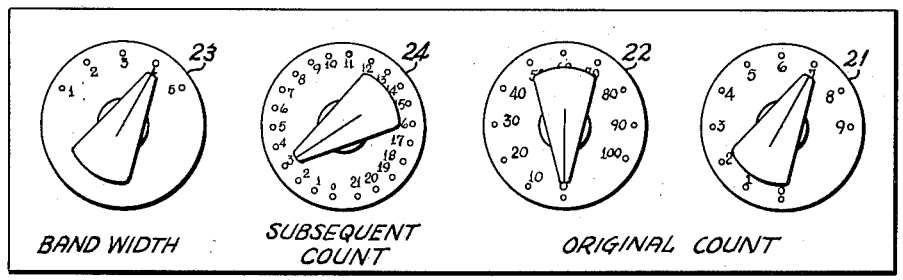
INVENTOR.
ALEXANDER GORDON, JR.
IVAN A. GREENWOOD, JR.
BY
ATTORNEY.

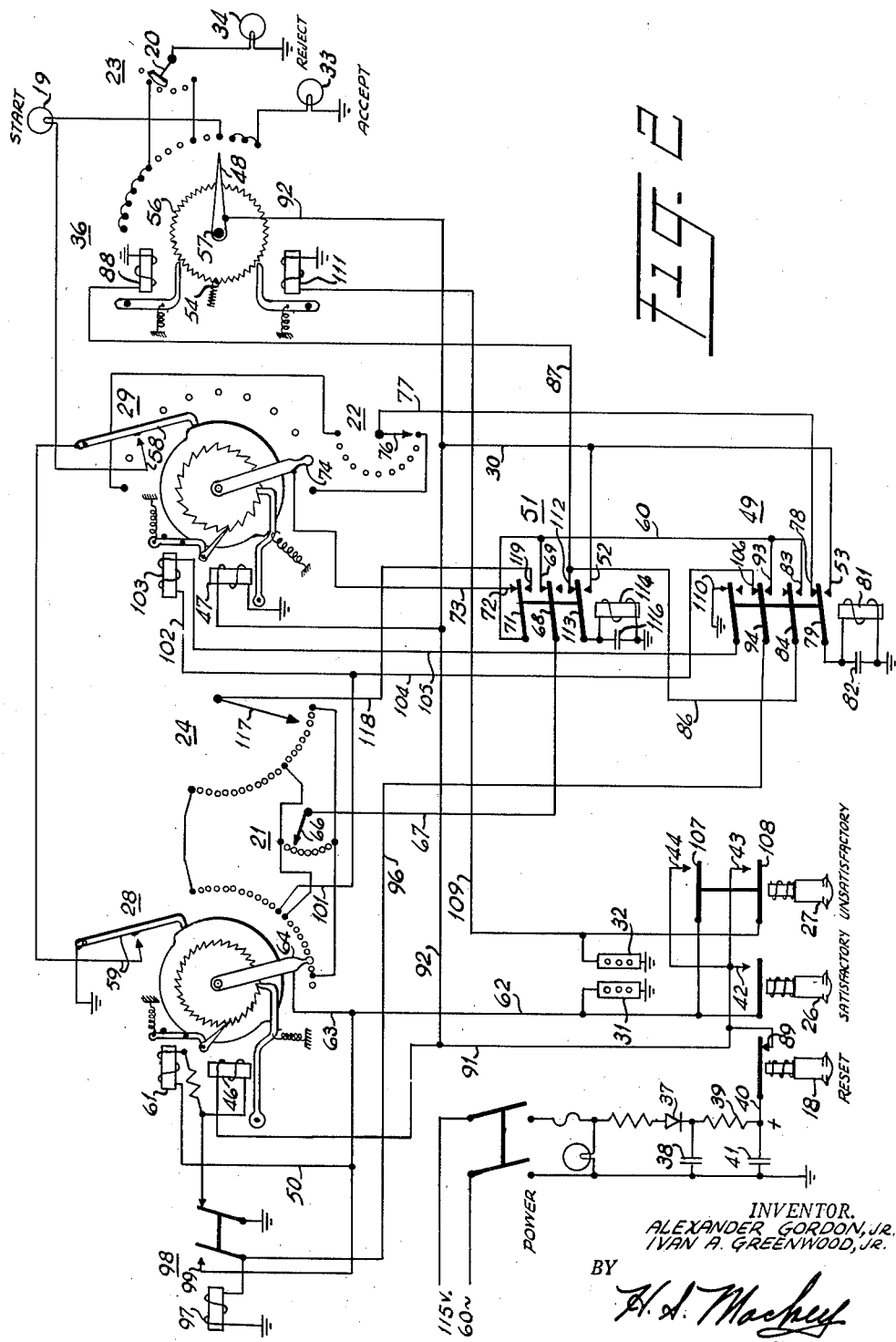

United States Patent Office 2,768,784
Patented Oct. 30, 1956

2,768,784

SEQUENTIAL INSPECTION INDICATOR

Alexander Gordon, Jr., Astoria, and Ivan A. Greenwood, Jr., Pleasantville, N. Y., assignors to General Precision Laboratory Incorporated, a corporation of New York Application August 6, 1952, Serial No. 302,948

15 Claims. (Cl. 235—61)

This invention pertains to sequential inspection indicators, and more specifically to devices for tallying inspection results and automatically computing probabilities to furnish information relative to whether the entire lot of devices under inspection should be accepted or rejected, as the case may be.

In industrial inspection of lots of supposedly identical product items it is often undesirable that each and every item be inspected as a basis for acceptance or rejection. In such instances only a representative sample consisting of a suitable number of items is abstracted from the whole and the items forming this sample tested and inspected. From the result of such sample inspection, a judgment is formed as to whether the entire lot is acceptable or not. Sample inspection of this nature may be made in several ways. The simplest to explain, understand, and execute is single-sample inspection. In this method a single sample of a suitable number of items is taken from the lot and all items in the sample are tested. If the defective items contained in the sample do not amount to more than a specified number, the entire lot is accepted, otherwise it is rejected.

The single-sample method of inspection using a fixed number of items has two disadvantages: first, clearly good and clearly bad samples requires excessive testing time, the sample being larger than required to form a judgment; and second, border-line lots cannot be judged definitely enough because the sample is too small.

What is most desirable for economical and at the same time adequate inspection, is an adjustment of the number of items in the sample tested and inspected in accordance with the facts determined during the continuance of the inspection. If the lot is border-line, the sample should be large and may even in some instances comprise the entire lot, that is, 100% inspection. If on the other hand, the lot is either all or nearly all good, or contains a great many defective items, such facts will be made apparent on inspection of a very small sample.

A sampling method in which the size of sample continuously depends upon the lot quality is termed the sequential method. In this method a redetermination of the size of sample to be inspected is made after every item inspected, or after every few items are inspected.

When such sequential inspection methods can be employed a maximum economy of time and effort is attained. That is, when a number of lots of items are each separately inspected by such methods, the average time required to arrive at appropriate decisions as respects each lot is materially reduced and yet more accurate judgments are made.

There is, however, a grave difficulty in the way of adopting sequential inspection for general use in factories or elsewhere, since in such instances the tallying of the results as the items are tested is considerably more complicated than in single-sample inspection. It is so much more complicated, in fact, as to have made sequential inspection impractical in most situations. An automatic tallying device is therefore desirable to simplify the work of the inspectors and to eliminate all possibility of human error in tallying. Such a device is provided by the instant invention.

It is obvious that in automatic inspection, as for example in the machine sizing of ball bearing, if sampling inspection is desired an automatic tallying instrument such as is provided by this invention can be employed, with automatic data insertion, thus providing the maximum economy and speed in the inspection operation by permitting the sequential method to be employed.

Such an instrument can also be applied directly in an industrial process by causing its output tally to be automatically inserted in the instrument.

One purpose of this invention then, is to provide a computing instrument in which the results of sampling inspection of a lot are tallied, and which, through sequential computation, presents in a suitable manner the required information regarding the acceptance or rejection of the lot.

Another purpose of the instant invention is to provide a sequential inspection indicator which automatically computes the size of sample that should be abstracted from a lot and which automatically indicates whether the lot should be accepted or rejected on the basis of the continuing inspection of the sample.

Fig. 1 is a graph representing the inspection of a sample by the sequential method.

Fig. 2 schematically depicts the circuit of the sequential inspection indicator of this invention.

Fig. 3 illustrates the setting dials of the sequential inspection indicator.

As an example of use of this invention, let it be supposed that a large lot of items of any character, such as machine screws, is to be inspected by the sequential method. A continuous record of the inspection results is kept by plotting a chart, the number of units inspected being plotted as abscissae and the number of units found unsatisfactory being plotted as ordinates.

The dashed line 11 of Fig. 1 represents such a graph. It shows that the first four items inspected were satisfactory and the vertical line rising one unit at abscissa 5 indicates that the fifth unit inspected was unsatisfactory. The sixth unit also was unsatisfactory, as is shown by a second vertical line at abscissa 6. The seventh unit tested was satisfactory but the eighth was not. Thus as the dashed line continues toward the right it graphically tallies or records the total number of units inspected, and as it rises at the 11th, 15th, 16th, 17th, 22nd, 23rd, 25th, 26th and 27th units it totalizes the number of units found unsatisfactory in the sample. At its right end it shows that when 27 units have been inspected 12 of them have been found unsatisfactory.

The minimum number of units that may form an inspection sample should bear some relation to the total number of units in the lot. It would be unsound, for instance, to inspect only 28 units out of a million units and expect that the result of the inspection would reflect the quality of the million lot accurately enough to accept or reject the entire lot. However, a sample quantity of 28 is usually more than adequate if the entire lot contains, for instance, only 50 units. In general there is for each size of lot a minimum sample quantity that may be selected for inspection so that the results will quite accurately represent the quality of the lot. The size of the sample depends primarily on the quality of the lot but also depends on other factors, such as the degree of certainty desired in the final judgment of the lot as to its acceptance or rejection. Such a minimum number is indicated in Fig. 1 at abscissa seven by a solid vertical line. It signifies that no fewer than seven good units are to be inspected, and that, when all seven are found to be good, the entire lot is to be accepted.

In the event the first seven units inspected contain a certain number of unsatisfactory units, the entire lot is to be rejected. This number of unsatisfactory units that indicates the clear probability that the entire lot is unacceptable is termed the bandwidth for rejection and is indicated in Fig. 1 by the horizontal line 12 at ordinate five. If, in inspecting seven units, five or more of them are unsatisfactory, this graph shows that the entire lot should be rejected.

The dashed line 11, indicating an inspection record, does not intersect either the vertical limit line 13 or the horizontal limit line 12. On the contrary, when seven units have been inspected the dashed line shows that two unsatisfactory units have been found. This indicates a degree of uncertainty calling for enlargement of the size of sample. The amount by which the sample is enlarged for each reject found depends both on the selected minimum initial count and on the degree of certainty desired in the final result and is three in Fig. 1. It is represented by the horizontal line 14 and vertical line 16 and indicates that in this case, as a "penalty" for the presence of a single unsatisfactory unit in the initial or minimum sample quantity of seven, the sample size is increased by three to a sample quantity of ten. This sample increase of three is termed the subsequent count. The reject limit indicated by the line 12 also rises at abscissae seven and ten so that the bandwith for rejection remains at five.

The procedure of requiring a sample increase every time an unsatisfactory sample is encountered is continued, giving rise to a regular step pattern 17, in which the rising lines are each one ordinate unit in length and the horizontal lines are each three abscissa units in length. These three-unit steps represent the subsequent count, the magnitude of which is denoted in Fig. 1 by S. The initial count is denoted by the letter A and the bandwidth for rejection by B.

In Fig. 2 a preferred form of the invention for performing sequential inspection of a lot of items is schematically illustrated. The instrumentality receives energy for the operation thereof from the usual power lines and conventional power supply diagrammatically illustrated by the rectifier 37 and filter circuit consisting of series resistor 39 and shunt condensers 38 and 41, so that a positive potential is applied to conductor 40. The conductor 40 is connected to the normally closed contacts 89 of a reset switch 18 as well as normally open contacts 42 of a satisfactory switch 26 and normally open contacts 43 and 44 connected in parallel of an unsatisfactory switch 27. A stepping switch 28 having an actuating coil 61 and a latching coil 46 is connected through conductor 62 to the contacts 42 and 43 of the satisfactory switch 26 and unsatisfactory switch 27 so that actuation of either switch 26 or 27 causes the switch 28 to be advanced one step and the arm 64 to successively engage its associated contacts. In this manner the unit actuation of either switch 26 or 27 is set into the instrument.

In order that, if desired, a count of considerable proportions may also be set into the device a second stepping switch 29 having an actuating coil 103 and latching coil 47 is also provided to insert tens count into the device. The actuating coil 103 of this latter stepping relay is actuated by a potential applied thereto over the conductors 102 and 101 whenever the arm 64 of the stepping switch 28 engages its contact numbered 10, so that on each tenth advance of the stepping switch 28 the stepping switch 29 is actuated one step.

A manual selecting switch 21, having a contact engaging arm 66 is provided with nine stationary contacts respectively interconnected with first nine contacts of the stepping switch 28. Similarly a manual selecting switch 22, having a contact engaging arm 76 is provided with stationary contacts respectively interconnected with the stationary contacts of the stepping switch 29. The two manual selecting switches 21 and 22 serve to preselect the number to be included in the initial count (A).

Additionally a manual selecting switch 24 having as illustrated a rotating arm 117 is provided with twenty-one fixed contacts each respectively interconnected with the entire twenty-one fixed contacts of the stepping switch 28. This latter manual selecting switch in conjunction with the stepping switch 28 serves to predetermine the number of the subsequent count (S).

Switch 28, therefore, has two functions, namely, that of inserting the initial count (A) and the subsequent (S) into the instrument and of producing proper operation on the occurrence of such counts. In order that this function may be separated and occur at the proper times a pair of interlocked relays 49 and 51 are provided to switch an output potential path from the selecting switch 21 to the selecting switch 24 at the completion of the initial count (A).

Accept or reject indications are accomplished by actuation of a stepping switch 36 operated in one or the other direction by either an actuating coil 88 or an actuating coil 111. The movable contact 48 of the stepping switch 36 has associated therewith a plurality of fixed contacts, those on one side of a selected neutral point being connected through an accept lamp 33 to ground. Those on the other side of the neutral point are connected to the respective fixed contacts of a manual selecting switch 23, the movable arm 20 of which is connected through a reject lamp 34 to ground. Preferably, although not necessarily the contact engaging portion of the arm 20 is made wide enough to engage two or three of its associated fixed contacts, so that a rejection indication will exist during the movement of the stepping switch 36 over more than one of the rejection selected contacts. Thus, if a rejection signal is not immediately noted, subsequent and further operation in the rejection direction will not produce a false indication that test should be continued but rather will continue to indicate rejection of the sample.

A start indicating light 19 is connected to the neutral contact of the stepping relay 36 and through contacts 58 of stepping switch 29 and contacts 59 of stepping switch 28 to ground. Contacts 59 and 58 are closed by cam members only when the rotary contacts 64 and 74 of stepping switches 28 and 29 are in their zero positions so that an indication that the instrument is in cleared condition for the beginning of a test run is given.

When it is desired to provide a totalizer count of the actuation of the satisfactory and unsatisfactory switches counters 31 and 32 are provided for this purpose.

The instant invention can be perhaps best understood by considering its mode of operation under various assumed conditions of test of a sample from a lot of items, and therefore, the various potential paths will be considered in detail in accordance with certain assumed conditions.

In order to properly begin a test the instrument must first be cleared and an indication of such cleared conditions obtained. Therefore, the reset button 18 is first actuated to open contacts 89. The circuit from the positive terminal of the power supply through conductors 40 and 91, locking coil 48 of stepping switch 28 to ground is thus opened and switch arm 64 returns to its zero contact position by reason of spring bias associated therewith. Likewise the switch arm 74 of the switch 29 is similiarly returned to engagement with its zero contact by interruption of the circuit extending from conductor 40 through the reset contacts 89, conductor 91, conductor 92, locking coil 47 of switch 29 to ground. Additionally the stepping switch 36 must be moved to its neutral position and this is accomplished by manual operation thereof, through the knob 57 against the holding force of the detent position retainer 54.

When this operation is completed and the reset button released a circuit is established from the conductor 40, through contacts 89 (now closed), conductor 91, conductor 92, arm 48 of switch 36, lamp 19, closed contacts 58 and 59 of switches 29 and 28 respectively to ground thus energizing the starting lamp 19 indicating that it is now proper to begin the test.

We must now select the parameters which will be proper for the tolerances permitted in the test we have in mind. For this purpose let us select an initial count (A) of seven, a subsequent count (S) of three and a rejector bandwidth (B) of five as assumed in connection with procedural discussion based on the graph of Fig. 1.

The initial count is selected by moving contact 66 of switch 21 to its seventh position, the subsequent count by moving contact 117 of switch 24 to its third position and the bandwidth by moving contact 20 of switch 23 so that its lower edge first engages its fifth contact. The switch 22 is retained in its zero position since we do not in this instance desire an initial count above ten. These manipulative steps are accomplished by rotation of the dials of Fig. 3 which are numbered in accordance with the switches to which they correspond.

Having cleared the instrument and selected the desired testing parameters we may now begin the actual testing procedure. Let it be assumed that the first item of the lot tested is satisfactory. The operator then actuates the satisfactory button 26 which momentarily establishes a circuit from the positive terminal of the source through conductor 40, closed contacts 89 of the reset switch, closed contacts 42 of the momentarily actuated satisfactory switch 26, conductor 62, conductor 50, actuating coil 61 of the stepping switch 28, and the normally closed contact of relay 98 to ground. The arm 64 is therefore stepped to its contact numbered 1.

Let it be assumed that the second item tested is unsatisfactory. In such instance, the operator actuates the unsatisfactory switch 27. Closure of the contacts 44 and 107 by actuation of this switch establishes a circuit from the positive terminal of the source through conductor 40, normally closed contacts 89 of switch 18, momentarily closed contacts 44 and 107, conductors 62 and 50, actuating coil 61 of stepping switch 28 and the normally closed contacts of relay 98 to ground. Thus the arm 64 is stepped to its contact numbered 2.

At the same time a second circuit is established which extends from the positive terminal of the source through contacts 43 and 108 of momentarily actuated switch 27, conductor 109, actuating coil 111 of stepping relay 36 to ground causing the contact arm to be actuated towards the reject limit. Since the bandwidth switch 23 has been set so that a circuit is not completed through the reject lamp 34 until the stepping switch 36 has moved its arm 48 to engage contact numbered 6, the only result of this action is to move the arm 48 one step from its neutral position in a direction away from the accept limit and towards the reject limit.

Now let it be assumed that the next five items are satisfactory resulting in the operator actuating the satisfactory switch 26 five successive times. This results in successive stepping of the arm 64 of the switch 28 over its contacts numbered 3, 4, 5 and 6 and to engage contact numbered 7. Since under our original assumptions the original count was selected as seven by setting the movable contact 66 of dial switch 21 to engage contact numbered 7 a circuit is now established which extends from the positive terminal of the source through contacts 42 of momentarily actuated switch 26, conductor 62, arm 64 to contact numbered 7 of switch 28, contact numbered 7 of dial switch 21 and arm 66 thereof, conductor 67, at present closed contact 69 of relay 51, contact 72 of the same relay, arm 74 of stepping switch 29, contact numbered 0 thereof, contact numbered 0 of dial switch 22, arm 76, conductor 77, closed contact 78 of relay 49, and actuating coil 81 thereof to ground. Relay 49 is therefore actuated at this time to shift its contact positions oppositely to that shown in Fig. 2.

At the same time relay 49 is locked up in this position by a circuit extending from ground through the actuating coil 81, contact 53 which is now closed, conductor 30, conductor 92, conductor 1, closed contacts 89 of the reset switch 18 to the positive terminal of the source.

Actuation of the relay 49 also establishes a circuit extending from the positive terminal of the source through arms 64 and 66 of switches 28 and 24, through conductor 67, at present closed contacts 69 of relay 51, contacts 83 now closed of relay 49, conductor 86, conductor 87 and actuating coil 88 of stepping switch 36 causing it to be moved one step in the direction of the accept limit. Since this switch was previously moved one step in the direction of its reject limit by operation of the unsatisfactory switch 27 the arm 48 of the stepping switch 36 is returned to its neutral or 0 numbered contact.

Imposition of a positive potential on the conductor 87 and hence the actuating coil 88 of the switch 36 through the circuit just described additionally produces a current flow through the actuating coil 114 of relay 51 by reason of a circuit established from ground through coil 114, closed contacts 112 to conductor 87.

Thus immediately subsequent to the actuation of relay 81 and the stepping switch 36 in a direction towards its accept limit, the relay 51 is operated to a position opposite to that shown in Fig. 2. When so actuated relay 51 is locked up by a circuit established from ground through coil 114, contacts 52 now closed, conductor 30, conductor 92, conductor 91, normally closed contacts 89 of the reset switch 18 to the positive terminal of the source. Since the lockup circuits for both relays 49 and 51 are established through the reset switch contacts any actuation of the switch will break the circuit and return relays 49 and 51 to their original position, i. e., as illustrated in Fig. 2.

Actuation of the relay 49 just prior to the actuation of the relay 51 also results in resetting the arm 64 of stepping switch 28 to its initial position by interrupting the energization of its locking coil 46. The locking coil 46 is energized as heretofore described by a circuit which includes in part the normally closed contacts of relay 98. When relay 49 is actuated while relay 51 is still in the position as illustrated in Fig. 2 a circuit is established from ground through the coil 97 of the relay 98, through conductor 96, contact 93 of relay 49, at present closed contact 69 of relay 51, conductor 67, arm 66 of dial switch 21, contact number 7 of both switch 21 and switch 28, arm 64, conductor 62 and either the satisfactory or unsatisfactory switches 26 or 27 depending on which one is momentarily closed to the positive potential terminal. Relay 98 is therefore momentarily actuated and the circuit for the latching coil 61 is broken and the arm 64 is urged towards its zero position under the force of the retracting spring. Since immediately the arm 64 leaves the selected contact 7 the circuit described for actuating the relay 97 is broken so that the latching coil circuit might be reestablished before the arm 64 has completed its travel to its initial zero position, a locking circuit is established for the relay 97 which is not broken until either the satisfactory or unsatisfactory switch is released, the time of actuation of these switches being sufficient for the purposes at hand.

This circuit extends from ground through the coil 97, contact 99 now closed, conductor 62, satisfactory or unsatisfactory switch contacts to the positive terminal of the source.

In the description of the operation thus far, the original count has been completed with six satisfactory items and one unsatisfactory and due to the presence of the unsatisfactory item in the initial sample no conclusive results have been reached. In fact the result was to first step the switch one step towards the reject limit and then one step towards the accept limit at the completion of the count so that the arm 48 is returned to its original neutral position and no conclusive indication has been obtained. The completion of the original count, however, resulted in actuation of the relays 49 and 51 which act to transfer the mechanism from its initial count state to the subsequent count state and to maintain the circuit in condition for acceptance of subsequent counts until a conclusion is reached. Thus the initial count setting determined by the dial switch 21 is removed from the circuit by the opening of contacts 69 of relay 51 and the subsequent count setting of switch 24 introduced into the circuit by the closing of contacts 119 of relay 51.

In any subsequent period an actuation of the unsatisfactory switch will result in an actuation of the stepping switch 36 one step in the direction of the reject limit by the circuit heretofore described. If, of course, in being so actuated the arm 48 reaches a contact connected to a contact of the switch 23 on which the arm 20 reposes the reject lamp 34 will light indicating that the entire lot should be rejected.

The circuit for actuating the stepping switch towards the accept limit in each series of subsequent count is, however, somewhat different from that previously described. In the assumption originally made three was selected as an appropriate subsequent count, and the circuits established will be described with this parameter in mind.

At the beginning of the subsequent count periods, the stepping switch 28 is in its zero position and the relays 49 and 51 are locked up. Assume now that the next three items tested are all satisfactory. After testing each item the switch 26 will be actuated advancing the stepping arm 64 one contact until the contact 3 is engaged thereby. When so engaged a circuit is established extending from the positive terminal of the source through the momentarily closed contacts 42 of switch 26, conductor 62, arm 64, contact 3 of switch 28, selected contact 3 of switch 24, arm 117, conductor 118, contact 119 of relay 51 (now closed), conductor 60, contact 83 of relay 49 (now closed), conductor 86, conductor 87 and actuating coil 88 of stepping switch 36 causing it to move one step in the direction of the accept limit. If this switch was in its neutral position at the beginning of the subsequent count and each item in the subsequent count was found to be satisfactory, the actuation of the arm 48 by completion of the subsequent count would complete a circuit to energize the accept lamp 33 indicating that testing could be terminated at this point and the entire lot accepted. Any intermediate unsatisfactory items, however, will result in actuation of the stepping switch one step in the direction of the reject limit requiring such number of subsequent counts containing satisfactory items as is equal to the number of individual unsatisfactory items.

After the completion of each subsequent count, whether accomplished by successive actuations of the satisfactory or unsatisfactory switches or a combination of actuations thereof the stepping switch 28 now operating as a subsequent count recorder is reset to its zero position in a manner similar to that previously described although through a circuit which differs to some extent.

This circuit may be traced from ground through the coil 97 of the relay 98, conductor 96, contact 93 (now closed) of relay 49, conductor 60, contact 119 (now closed) of relay 51, conductor 118, switch arm 117 of selector switch 24, contacts 3 of switches 24 and 28, conductor 62, contacts of satisfactory or unsatisfactory switches 26 and 27 to the positive terminal of the supply source. Thus relay 97 is actuated interrupting the circuit for the latching relay 46 as previously described, permitting the arm 64 to be returned to its original position.

In the original assumption in describing the operation of the device the original count was assumed as less than ten so that the stepping relay 29 and its associated dial switch was not vitally involved in the circuits established for original count actuation. A similar situation obtains, however, when a count higher than ten is selected. Suppose for example the exigencies of the situation require an original count of seventeen, in such cases the dial switch 21 is set at 7 and the dial switch 22 at 10. After the first seven actuations of the stepping switch 28 when the arm 64 rests on contact 7 a circuit is not completed to actuate relay 49 as previously described in connection with the assumed condition of an original count of seven since the circuit previously described is broken by the displacement of the arm 76 of the switch 22 to its 10 position. Thus at this time the relays 49 and 51 remain in the position illustrated in Fig. 2.

Continued actuation of either switch 26 or switch 27 continued to result in stepping of the arm 64 until the contact 10 is engaged. At such time a circuit is completed from the positive terminal through arm 64, contact 10, conductor 101, conductor 102, actuating coil 103 of stepping switch 29, conductor 105, contact 110 of relay 49 to ground, thus actuating stepping switch arm 74 to its 10 contact. At the same time a second circuit is completed from the positive terminal through the arm 64, contact 10, conductor 101, conductor 104, closed contact 106 of relay 49, conductor 96 and coil 97 of relay 98 to ground to actuate relay 98 breaking the latching coil circuit of stepping switch 28 and permitting the arm 64 to be returned to its starting position. After seven more actuations of either switches 26 or 27 a circuit is then established through contacts 7 of switch 28 and switch 24, close contacts 69 and 72 of relay 51, arm 74 of switch 29 now reposing on its 10 contact, the 10 contact of switch 22, arm 76 positioned thereon, conductor 77, contact 78 of relay 49 and operating coil 81 to ground.

Thus relays 49 and 51 are sequentially operated at this time in the manner previously described and all other circuits are completed as heretofore set forth.

To summarize briefly, then, the three parameters necessary for a sequential testing procedure may be selected at will and set in by dial switches 21 and 22 acting to select the original count desired, dial switch 24 acting to select the subsequent count, and dial switch 23 acting to select the band width or tolerance.

Having selected these parameters, each actuation of the unsatisfactory switch 27 moves the stepping switch 28 one step and also moves the stepping switch 36 one step towards the reject limit. Each actuation of the satisfactory switch also actuates the stepping switch 28 one step to continue the counting operation but the stepping switch 36 is not operated a step towards its accept limit until the stepping switch 28 and stepping switch 29, if utilized, have been actuated such number of times as to complete the initial count set into the instrument. The initial count having been completed relays 49 and 51 are actuated to disconnect the stepping switch 28 from the initial count circuit and to connect it into the subsequent count circuit.

As before during the subsequent count periods each actuation of the unsatisfactory switch 27, moves the switch one step towards its reject limit but the subsequent count must be completed by the stepping switch 28 before the stepping switch 36 can be moved a step towards its accept limit. Thus each unsatisfactory item, short of a sufficient number during any period to actuate the stepping switch to its reject limit and thus indicate that the entire lot should be rejected, requires an increased number of satisfactory items to be tested before acceptance is indicated.

While the invention has been described utilizing satisfactory and unsatisfactory switches which are manually actuated by the operator, it will be appreciated that in testing many items the testing of the item itself may be used as a means for actuating these switches.

What is claimed is:

1. A sequential inspection indicator for determining the acceptance or rejection of a lot of items from a sample thereof, the number of items contained in said sample variably depending on the continuing proportion of satisfactory to unsatisfactory items inspected comprising, a pair of momentary circuit closure means, a stepping means having discrete steps of movement in one direction towards a first limit and discrete steps of movement in the opposite direction towards a second limit, rejection indicating means operated by the actuation of said stepping means to its first limit, acceptance indicating means operative by actuation of said stepping means to its second limit, means for operating said stepping means a discrete step in the direction towards its first limit by each actuation of one of said pair of momentary circuit closure means, and means for operating said stepping means a discrete step in the direction towards its second limit by a predetermined multiple of actuations of either of said pair of momentary circuit closure means.

2. A sequential inspection indicator for determining the acceptance or rejection of a lot of items from a sample thereof, the number of items contained in said sample variably depending on the continuing proportion of satisfactory to unsatisfactory items inspected comprising, a pair of momentarily operated switches, a stepping means having discrete steps of movement in one direction towards a first limit and discrete steps of movement in the opposite direction towards a second limit, rejection indicating means operated by the actuation of said stepping means to its first limit, acceptance indicating means operative by actuation of said stepping means to its second limit, means for operating said stepping means a discrete step in the direction towards its first limit by each actuation of one of said pair of switches, means for operating said stepping means in the direction towards its second limit by a predetermined multiple of actuations of either of said pair of switches, and means for selectively varying the number of steps encompassed between said first and second limits.

3. A sequential inspection indicator for determining the acceptance or rejection of a lot of items from a sample thereof, the number of items contained in said sample variably depending on the continuing proportion of satisfactory to unsatisfactory items inspected comprising, a pair of momentarily operated switches, a stepping means having discrete steps of movement in one direction towards a first limit and discrete steps of movement in the opposite direction towards a second limit, rejection indicating means operated by the actuation of said stepping means to its first limit, acceptance indicating means operative by actuation of said stepping means to its second limit, counting means actuated by operation of either of said pair of switches, means operative by each actuation of one of said switches for advancing said stepping means a discrete step in the direction of its first limit and means including said counting means for actuating said stepping means by a discrete step in the direction of its second limit on completion of a selectable number of actuations of said counting means.

4. A sequential inspection indicator for determining the acceptance or rejection of a lot of items from a sample thereof, the number of items contained in said sample variably depending on the continuing proportion of satisfactory to unsatisfactory items inspected comprising, a pair of momentarily operated switches, a stepping means having discrete steps of movement in one direction towards a first limit and discrete steps of movement in the opposite direction towards a second limit, rejection indicating means operated by the actuation of said stepping means to its first limit, acceptance indicating means operative by actuation of said stepping means to its second limit, counting means actuated by operation of either of said pair of switches, means operative by each actuation of one of said switches for advancing said stepping means a discrete step in the direction of its first limit, means including said counting means for actuating said stepping means by a discrete step in the direction of its second limit on completion of a selectable number of actuations of said counting means, and means for selectively varying the number of discrete steps encompassed between said first and second limits.

5. A sequential inspection indicator for determining the acceptance or rejection of a lot of items from a sample thereof, the number of items contained in said sample variably depending on the continuing proportion of satisfactory to unsatisfactory items inspected comprising, a pair of momentarily operated switches, a stepping means having discrete steps of movement in one direction towards a first limit and discrete steps of movement in the opposite direction towards a second limit, rejection indicating means operated by the actuation of said stepping means to its first limit, acceptance indicating means operative by actuation of said stepping means to its second limit, counting means successively actuated by operation of either of said pair of switches, means operative by each actuation of one of said switches for advancing said stepping means a discrete step in the direction of its first limit, means including said counting means for initially actuating said stepping means by a discrete step in the direction of its second limit on initial completion of a selectable number of actuations of said counting means, and means for thereafter actuating said stepping means by discrete steps in a direction of its second limit on each completion of a second selectable number of actuations of said counting means.

6. A sequential inspection indicator for determining the acceptance or rejection of a lot of items from a sample thereof, the number of items contained in said sample variably depending on the continuing proportion of satisfactory to unsatisfactory items inspected comprising, a pair of momentarily operated switches, a stepping means having discrete steps of movement in one direction towards a first limit and discrete steps of movement in the opposite direction towards a second limit, rejection indicating means operated by the actuation of said stepping means to its first limit, acceptance indicating means operative by actuation of said stepping means to its second limit, counting means successively actuated by operation of either of said pair of switches, means operative by each actuation of one of said switches for advancing said stepping means a discrete step in the direction of its first limit, means including said counting means for initially actuating said stepping means by a discrete step in the direction of its second limit on initial completion of a selectable number of actuations of said counting means, means for thereafter actuating said stepping means by discrete steps in a direction of its second limit on each completion of a second selectable number of actuations of said counting means, and means for selectively varying the number of discrete steps encompassed between said first and second limits.

7. A sequential inspection indicator for determining the acceptance or rejection of a lot of items from a sample thereof, the number of items contained in said sample variably depending on the continuing proportion of satisfactory to unsatisfactory items inspected comprising, a pair of momentarily operated switches, a stepping means having discrete steps of movement in one direction towards a first limit and discrete steps of movement in the opposite direction towards a second limit, rejection indicating means operative by actuation of said stepping means to its first limit, acceptance indicating means operative by actuation of said stepping means to its second limit, counting means successively actuated by operation of either of said pair of switches, means operative by each actuation of one of said switches for advancing said stepping means a discrete step in the direction of its first limit, means operative by a selectable number of actuations of said counting means for actuating said stepping means a discrete step in the direction of its second limit, means for returning said counting means to its initial condition of operation on completion of said selectable number of actuations, means for thereafter operating said stepping means a discrete step in the direction of its second limit on completion of a second selectable number of actuations of said counting means, and means for returning said counting means to its initial condition of operation on each completion of said second selectable number of actuations.

8. A sequential inspection indicator for determining the acceptance or rejection of a lot of items from a sample thereof, the number of items contained in said sample variably depending on the continuing proportion of satisfactory to unsatisfactory items inspected comprising, a pair of momentarily operated switches, a stepping means having discrete steps of movement in one direction towards a first limit and discrete steps of movement in the opposite direction towards a second limit, rejection indicating means operative by actuation of said stepping means to its first limit, acceptance indicating means operative by actuation of said stepping means to its second limit, counting means successively actuated by operation of either of said pair of switches, means operative by each actuation of one of said switches for advancing said stepping means a discrete step in the direction of its first limit, means operative by a selectable number of actuations of said counting means for actuating said stepping means a discrete step in the direction of its second limit, means for returning said counting means to its initial condition of operation on completion of said selectable number of actuations, means for thereafter operating said stepping means a discrete step in the direction of its second limit on completion of a second selectable number of actuations of said counting means, means for returning said counting means to its initial condition of operation on each completion of said second selectable number of actuations, and means for selectively adjusting the number of discrete steps encompassed between said first and second limits.

9. A sequential inspection indicator for determining the acceptance or rejection of a lot of items from a sample thereof, the number of items contained in said sample variably depending on the continuing proportion of satisfactory to unsatisfactory items inspected comprising, a pair of momentarily operated switches, a counter including a movable contact and a plurality of fixed contacts arranged for progressive engagement thereby, means for advancing the progressive engagement of said fixed contacts by said movable contact on each actuation of either of said switches, means for applying a potential pulse to said movable contact by actuation of either of said switches, stepping means operative in discrete steps in either of two opposite directions towards first and second limits, a first potential pulse operated means for advancing said stepping means a discrete step in the direction of its first limit on application of a potential pulse thereto, means for applying a potential pulse to said first potential pulse operated means with each actuation of one of said switches, a second potential pulse operated means for advancing said stepping means a discrete step in the direction of its second limit by application of a potential pulse thereto, a circuit including normally open switch means interconnecting said second potential pulse operated means and a selected fixed contact of said counter, means for closing said switch means on engagement of said selected fixed contact by said movable contact, means for restoring said movable contact to its initial operative position by actuation of said switch means, rejection indicating means operative by actuation of said stepping means to its first limit, and acceptance indicating means operative by actuation of said stepping means to its second limit.

10. A sequential inspection indicator for determining the acceptance or rejection of a lot of items from a sample thereof, the number of items contained in said sample variably depending on the continuing proportion of satisfactory to unsatisfactory items inspected comprising, a pair of momentarily operated switches, a counter including a movable contact and a plurality of fixed contacts arranged for progressive engagement thereby, means for progressively advancing the engagement of said movable contact with successive ones of said fixed contacts by each actuation of either of said switches, means for applying a potential pulse to said movable contact by actuation of either of said switches, stepping means operative in discrete steps in either of two opposite directions towards first and second limits, a first actuating means for advancing said stepping means a discrete step in the direction of its first limit on each application of a potential pulse thereto, means for applying a potential pulse to said first actuating means by each operation of one of said switches, a second actuating means for advancing said stepping means a discrete step in the direction of its second limit on each application of a pulse thereto, a first circuit interconnecting a selected fixed contact of said counter and said second actuating means, said first circuit including normally closed contacts and normally open contacts, a second circuit interconnecting a selected fixed contact of said counter and said second actuating means, said second circuit including normally open contacts, first contact actuating means operated by engagement of said movable contact with said first mentioned selected fixed contact to close the normally open contacts of said first circuit, second contact actuating means operated by actuations of said first contact engaging means to open said normally close contacts of said first circuit and simultaneously close the normally open contacts of said second circuit, means operative by the engagement of said movable contact with either of said first or second mentioned selected fixed contacts and the actuation of said first contact actuating means for restoring said movable contact to its initial condition, rejection indicating means operative by actuation of said stepping means to its first limit, and acceptance indicating means operative by actuation of said stepping means to its second limit.

11. A sequential inspection indicator as set forth in claim 10 including a first adjustable selector switch connected in said first circuit and to a plurality of said fixed contacts, and a second adjustable selector switch connected in said second circuit and to a plurality of said fixed contacts whereby said first mentioned selected fixed contact may be any one of said plurality of fixed contacts and said second mentioned selected fixed contact may likewise be any one of said plurality of fixed contacts.

12. A sequential inspection indicator as set forth in claim 11 including means for selectively varying the number of steps encompassed between said first and second limits.

13. A sequential inspection indicator for determining the acceptance or rejection of a lot of items from a sample thereof, the number of items contained in said sample variably depending on the continuing proportion of satisfactory to unsatisfactory items inspected comprising, a pair of momentarily operated switches, a counter including a movable contact and a plurality of fixed contacts arranged for progressive engagement thereby, means for progressively advancing the engagement of said movable contact with successive ones of said fixed contacts by each actuation of either of said switches, means for applying a potential pulse to said movable contact by actuation of either of said switches, stepping means operative in discrete steps in either of two opposite directions towards first and second limits, a first actuating means for advancing said stepping means a discrete step in the direction of its first limit on each application of a pulse thereto, means for applying a potential pulse to said first actuating means by each operation of one of said switches, a second actuating means for advancing said stepping means a discrete step in the direction of its second limit on each application of a pulse thereto, a first circuit interconnecting a selected fixed contact of said counter and said second actuating means, a second circuit interconnecting a selected fixed contact of said counter and said second actuating means, a first relay having a pair of normally open contacts interposed in said first circuit, a second relay having a pair of normally open contacts interposed in said second circuit and a pair of normally closed contacts interposed in said second circuit, circuit means for operating said first relay on the engagement of said first mentioned selected fixed contact by said movable contact, circuit means for operating said second relay by actuation of said first relay, lockup means for each of said relays, means operated by actuation of said first relay and the engagement of said first mentioned selected fixed contact for restoring said movable contact to its initial position, means operated by said second relay for inhibiting operation of said last mentioned means and for restoring said movable contact to its original position on engagement thereby with said second mentioned selected fixed contact, rejection indicating means operated by actuation of said stepping means to its first limit, and acceptance indicating means operated by actuation of said stepping means to its second limit.

14. A sequential inspection indicator as set forth in claim 13 including a first adjustable selector switch interposed in said first circuit, said first selector switch having a plurality of fixed contacts connected to respective fixed contacts of said counter and a movable contact engageable with any one of the fixed contacts thereof and a second adjustable selector switch interposed in said second circuit, said second selector switch having a plurality of fixed contacts connected to respective fixed contacts of said counter and a movable contact engageable with any one of the fixed contacts thereof.

15. A sequential inspection indicator as set forth in claim 14 including means for selectively varying the number of steps encompassed between said first and second limits.

References Cited in the file of this patent

UNITED STATES PATENTS

| | | |
|---|---|---|
| 2,549,071 | Dusek | Apr. 17, 1951 |
| 2,560,172 | Jones | July 10, 1951 |
| 2,594,865 | Bumstead | Apr. 29, 1952 |
| 2,594,960 | May | Apr. 29, 1952 |
| 2,604,262 | Phelps | July 22, 1952 |
| 2,622,802 | Handley | Dec. 23, 1952 |